United States Patent
Koiwai et al.

(10) Patent No.: US 10,320,257 B2
(45) Date of Patent: Jun. 11, 2019

(54) ELECTRIC MOTOR AND METHOD FOR MANUFACTURING SAME

(71) Applicant: KOBELCO CONSTRUCTION MACHINERY CO., LTD., Hiroshima-shi (JP)

(72) Inventors: Kazushige Koiwai, Hiroshima (JP); Seiji Saiki, Hiroshima (JP)

(73) Assignee: KOBELCO CONSTRUCTION MACHINERY CO., LTD., Hiroshima-shi (JP)

(*) Notice: Subject to any disclaimer, the term of this patent is extended or adjusted under 35 U.S.C. 154(b) by 238 days.

(21) Appl. No.: 15/185,757

(22) Filed: Jun. 17, 2016

(65) Prior Publication Data

US 2016/0380502 A1 Dec. 29, 2016

(30) Foreign Application Priority Data

Jun. 29, 2015 (JP) .................................. 2015-129727

(51) Int. Cl.
*H02K 3/50* (2006.01)
*H02K 5/08* (2006.01)
(Continued)

(52) U.S. Cl.
CPC ................. *H02K 3/50* (2013.01); *H02K 3/38* (2013.01); *H02K 3/44* (2013.01); *H02K 5/08* (2013.01);
(Continued)

(58) Field of Classification Search
CPC .. H02K 3/38; H02K 3/44; H02K 3/50; H02K 5/08; H02K 5/10; H02K 5/225; H02K 15/12; H02K 15/0062
(Continued)

(56) References Cited

U.S. PATENT DOCUMENTS 7,061,146 B2 * 6/2006 Hirt ......................... F16D 28/00
 310/43
8,618,703 B2 * 12/2013 Kinoshita ............... F04B 35/04
 310/71

(Continued)

FOREIGN PATENT DOCUMENTS

DE 201 10 909 U1 11/2002
EP 1 883 147 A2 1/2008
(Continued)

OTHER PUBLICATIONS

Office Action dated May 9, 2017 in Japanese Patent Application No. 2015-129727 (with unedited computer generated English translation obtained from the EPO Global Dossier).
(Continued)

*Primary Examiner* — John K Kim
(74) *Attorney, Agent, or Firm* — Oblon, McClelland, Maier & Neustadt, L.L.P.

(57) ABSTRACT

An electric motor has: a rotor; a stator; a housing, an opening for opening the storage space upward, and a notch that is concaved downward from an edge surface surrounding the opening; a lead wire connected to the stator; a partition wall that is provided on the inside of the notch in order to separate a sealing space for injecting a sealant and a space outside the sealing space from each other, and has a through-hole for allowing the lead wire to be extended to the outside of the sealing space; a cover that can be attached to the housing from above; and an elastic member that is more elastic than the partition wall and disposed under the partition wall. An end surface of the partition wall is disposed on or above a plane surface including the edge surface of the housing.

8 Claims, 6 Drawing Sheets

(51) Int. Cl.
*H02K 5/22* (2006.01)
*H02K 15/12* (2006.01)
*H02K 3/44* (2006.01)
*H02K 15/00* (2006.01)
*H02K 3/38* (2006.01)
*H02K 5/10* (2006.01)

(52) U.S. Cl.
CPC ......... *H02K 5/225* (2013.01); *H02K 15/0062* (2013.01); *H02K 15/12* (2013.01); *H02K 5/10* (2013.01)

(58) Field of Classification Search
USPC ...................................................... 310/71, 89
See application file for complete search history.

(56) References Cited

U.S. PATENT DOCUMENTS

| | | | | |
|---|---|---|---|---|
| 9,973,053 | B2* | 5/2018 | Nakazumi | ................ H02K 5/10 |
| 2005/0082918 | A1* | 4/2005 | Hirt | ........................ F16D 28/00 310/43 |
| 2008/0020634 | A1 | 1/2008 | Taniguchi et al. | |
| 2013/0330217 | A1 | 12/2013 | Enami et al. | |
| 2015/0108859 | A1 | 4/2015 | Nakazumi et al. | |
| 2016/0380502 | A1* | 12/2016 | Koiwai | .................... H02K 5/08 310/71 |

FOREIGN PATENT DOCUMENTS

| | | |
|---|---|---|
| EP | 2 672 117 A1 | 12/2013 |
| EP | 2 852 033 A1 | 3/2015 |
| JP | 2005-522977 A | 7/2005 |
| JP | 2008-028267 A | 2/2008 |
| JP | 2013-240215 | 11/2013 |
| WO | WO 03/088453 A1 | 10/2003 |

OTHER PUBLICATIONS

Extended European Search Report dated Nov. 24, 2016 in Patent Application No. 16175628.3.

* cited by examiner

ELECTRIC MOTOR AND METHOD FOR MANUFACTURING SAME

TECHNICAL FIELD

The present invention relates to an electric motor which has a housing for storing a rotor and a stator and in which a sealant for covering at least a part of the stator is injected into the housing.

BACKGROUND ART

The electric motor described in, for example, Japanese Unexamined Patent Publication No. 2013-240215 has been known as such electric motor.

The electric motor described in Japanese Unexamined Patent Publication No. 2013-240215 has a rotor, a stator provided around the rotor, a housing for storing the rotor and the stator, a lead wire connected electrically to the stator, a partition wall that separates a sealing space for injecting a sealant into the housing and a space outside the sealing space from each other and allows the lead wire to be extended to the outside of the sealing space, and a cover that is attached to the housing and the partition wall.

The housing has an opening for opening a storage space to one side of an axial direction along the central axis of rotation of the rotor, the storage space storing the rotor and the stator. A notch that is concaved from an edge surface surrounding this opening toward the other side of the axial direction is formed in the housing.

The partition wall is made from an elastic member (such as silicone rubber) and inserted into the notch of the housing. A through-hole into which the lead wire is inserted is formed in the partition wall.

The cover is attached to the housing and the partition wall while in contact with the edge surface surrounding the opening of the housing (the storage space) and an end surface of the partition wall in order to close the opening of the housing.

The electric motor described in Japanese Unexamined Patent Publication No. 2013-240215 is manufactured as follows.

The stator is inserted into a predetermined position inside the housing that has the partition wall attached beforehand.

The lead wire connected to the stator is inserted into the through-hole of the partition wall, and then the partition wall is inserted into the notch of the housing.

An injection mold is mounted onto the housing and the partition wall from one side of the axial direction. This brings the injection mold into contact with the edge surface of the housing and the end surface of the partition wall, creating the sealing space for injecting the sealant, between the injection mold, the housing, and the partition wall.

In this condition, the sealant is injected into the sealing space through the injection mold.

In some cases, the sealant is injected, with the cover mounted on the housing and the partition wall rather than the injection mold.

However, the fact that the partition wall is made from an elastic member creates a risk that the partition wall might elastically deform under pressure of the sealant upon injection thereof, causing the sealant to leak to the outside of the housing through between the partition wall and the housing or the injection mold (or the cover).

Although a metal partition wall can be used as another example of the partition wall as described in Japanese Unexamined Patent Publication No. 2013-240215, use of a metal partition wall makes it difficult to align the position of the edge surface of the housing and the position of the end surface of the partition wall along the axial direction. Misalignment of these surfaces creates a risk that the sealant might leak from between the housing, the partition wall, and the injection mold or the cover during the injection of the sealant.

SUMMARY OF INVENTION

An object of the present invention is to provide an electric motor capable of preventing leakage of a sealant upon injection thereof, and a method for manufacturing the electric motor.

In order to achieve this object, the present invention provides an electric motor, having: a rotor; a stator disposed around the rotor; a housing that has a storage space for storing the rotor and the stator, an opening for opening the storage space to one side of an axial direction along a central axis of rotation of the rotor, and a notch that is concaved from an edge surface surrounding the opening toward the other side of the axial direction; a lead wire connected to the stator; a partition wall that is provided on the inside of the notch of the housing in order to separate a sealing space for injecting a sealant for covering at least a part of the stator and a space outside the sealing space from each other, and has a through-hole for allowing the lead wire to be extended to the outside of the sealing space; a cover that can be attached to the housing from the one side of the axial direction; and an elastic member that is more elastic than the partition wall and overlapped with the partition wall in the axial direction, wherein an end surface of the partition wall or of the elastic member that is disposed on the one side of the axial direction is disposed on a plane surface including the edge surface of the housing or on the one side of the axial direction with respect to the plane surface, and the cover has a flat contact surface capable of coming into contact with the end surface of the partition wall or of the elastic member and the edge surface of the housing.

The present invention can prevent leakage of the sealant upon injection thereof.

DESCRIPTION OF EMBODIMENTS

Embodiments of the present invention are described hereinafter with reference to the accompanying drawings. It should be noted that the following embodiments are the examples embodying the present invention and are not intended to limit the technical scope of the present invention.

First Embodiment

Figure 1:
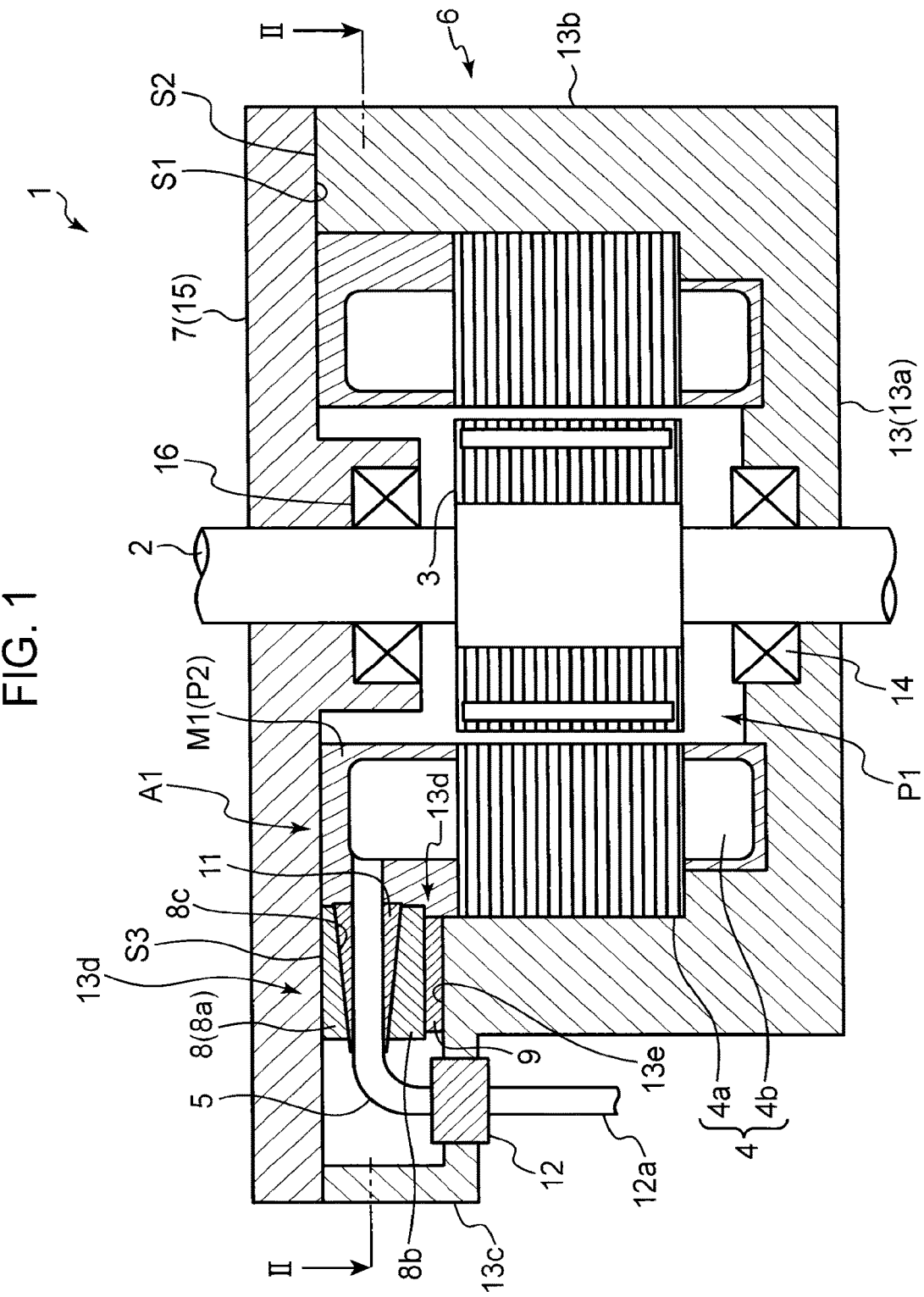
FIG. 1 is a cross-sectional diagram showing an electric motor according to a first embodiment of the present invention.
Figure 2:
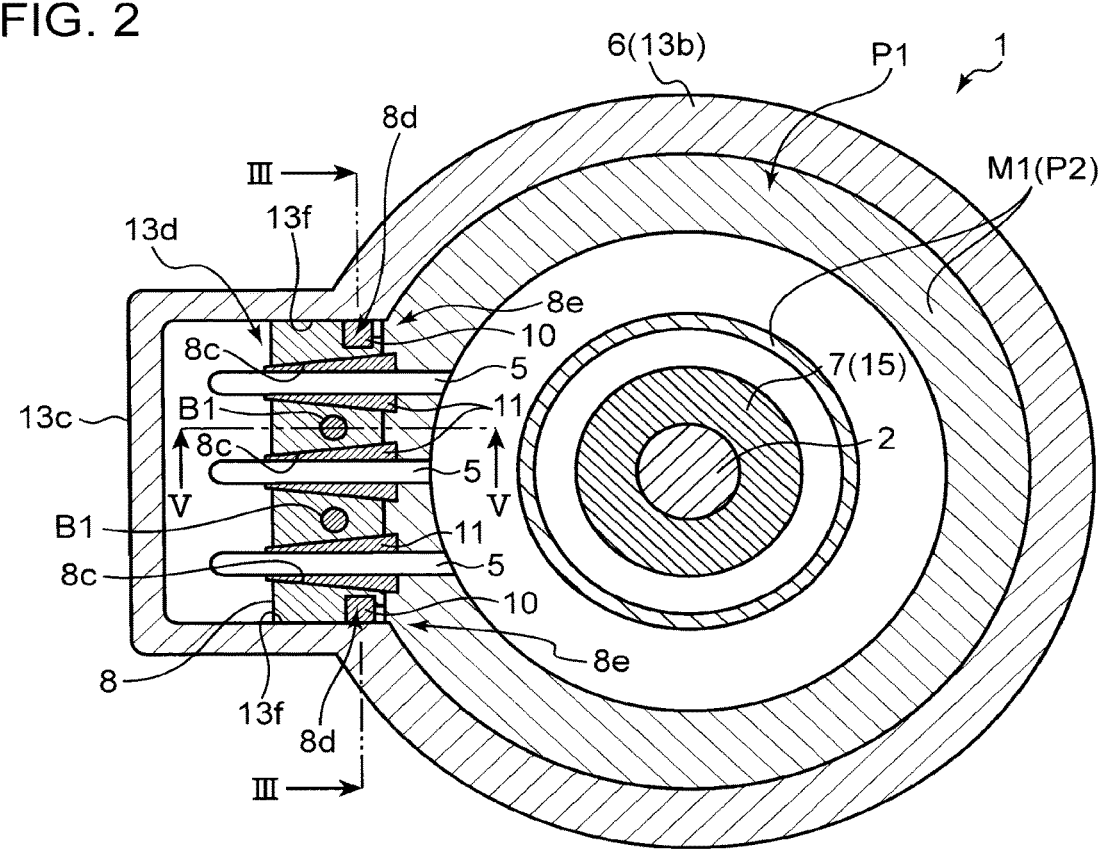
FIG. 2 is a cross-sectional diagram taken along line II-II of FIG. 1.

An electric motor 1 according to a first embodiment of the present invention has, as shown in FIGS. 1 and 2, a shaft 2, a rotor 3 fixed to an intermediate portion of the shaft 2, a stator 4 disposed around the rotor 3, a lead wire 5 connected to the stator 4, a housing 6 storing the rotor 3 and the stator 4, and a cover 7 that is attached to the housing from one side of an axial direction (from the upper side of FIG. 1) along the central axis of rotation of the rotor 3 (the central axis of the shaft 2). Note that the following description is based on the assumption that one side of the axial direction is the upper side and the other side is the lower side.

The shaft 2 extends along a vertical direction. While the upper part of the shaft 2 above the rotor 3 is supported rotatably by a bearing 16 provided in the cover 7, the lower part of the shaft 2 is supported rotatably by a bearing 14 provided in the housing 6. In addition, both ends of the shaft 2 are inserted into through-holes of the housing 6 and the cover 7 and disposed outside the housing 6 and the cover 7.

The rotor 3 is fixed to the part of the shaft 2 between the bearings 14, 16.

At least a part of the stator 4 is covered with a sealant M1 containing synthetic resin such as unsaturated polyester, which is injected into the housing 6 (FIG. 1 shows that the entire stator 4 is covered with the sealant). In other words, at least a part of the stator 4 is molded with the sealant M1.

The stator 4 also has a stator core 4a formed from a stack of electromagnetic steel sheets, and a stator coil 4b wrapped around the stator core 4a in the vertical direction. The upper and lower coil ends of the stator coil 4b where the stator coil 4b is folded back protrude above and below the stator core 4a.

The lead wire 5 is connected to the upper coil end of the stator coil 4b. The lead wire 5 is also extended to the outside of a space inside the housing 6 into which the sealant M1 is injected (a sealing space P2), through a notch 13d of the housing 6, which is described hereinafter.

The housing 6 has the bearing 14 supporting the shaft 2 and a housing main body 13 holding the bearing 14.

The housing main body 13 has a storage space P1 for storing the rotor 3 and the stator 4, an opening A1 opening the storage space P1 upward (toward one side of the axial direction), and the notch 13d that is concaved downward (toward the other side of the axial direction) from an edge surface S2 surrounding the opening A1.

Specifically, the housing main body 13 has a bottom wall 13a, a peripheral wall 13b provided standing on a peripheral edge of the bottom wall 13a, and a terminal fitting portion 13c protruding toward the radially outside of the rotor 3 from the peripheral wall 13b (away from the central axis of rotation in the direction perpendicular to the axial direction). The storage space P1 is surrounded by the bottom wall 13a and the peripheral wall 13b.

The peripheral wall 13b is provided over the entire circumference around the central axis of rotation of the rotor 3 and has the opening A1 that is formed at an upper end of the peripheral wall 13b to open the storage space P1 upward. In addition, the notch 13d that is concaved from the edge surface S2 (an upper surface) surrounding the opening A1 is formed on the peripheral wall 13b.

The terminal fitting portion 13c defines the space that extends from the notch 13d toward the radially outside of the rotor 3, and holds a terminal block 12 in such a manner as to face the inside of this space. The lead wire 5 is connected to the terminal block 12 and an external wire 12a is connected to the terminal block 12 from the outside of the housing 6.

The cover 7 is attached to the housing 6 from above (one side of the axial direction) so as to cover the opening A1 of the housing 6. Specifically, the cover 7 has the bearing 16 supporting the shaft 2 and a cover main body 15 for holding the bearing 16. The cover main body 15 has a flat contact surface S1 capable of coming into contact with the edge surface S2 surrounding the opening A1 of the housing 6.

The electric motor 1 also has a partition wall 8, an elastic member 9, a pair of side elastic members 10, and a grommet 11 in order to allow the lead wire 5 to be extended out of the sealing space P2 of the housing 6 and prevent leakage of the sealant M1 upon injection thereof.

Figure 3:
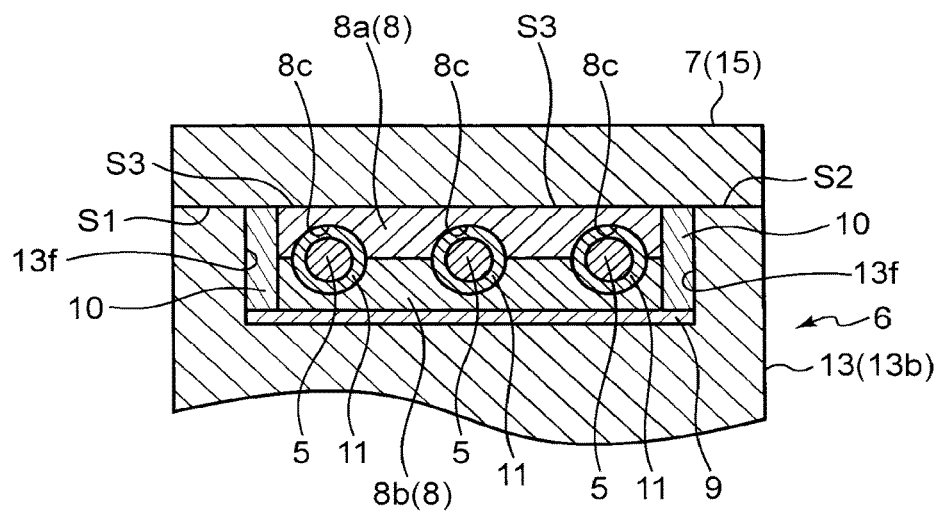
FIG. 3 is a cross-sectional diagram taken along line of FIG. 2.

As shown in FIGS. 1 to 3, the partition wall 8 is provided on the inside of the notch 13d of the housing 6 in order to separate the sealing space P2 and a space outside the sealing space P2 from each other.

Furthermore, through-hole 8c that each allow the lead wire 5 to be extended to the outside of the sealing space P2 are formed in the partition wall 8. Specifically, the partition wall 8 has an upper piece 8a, a lower piece 8b provided under the upper piece 8a, and the through-holes 8c between a lower surface of the upper piece 8a and an upper surface of the lower piece 8b.

An internal surface of each through-hole 8c tapers in which the diameter of the through-hole 8c gradually becomes small toward the radially outside of the rotor 3. Similarly, an external surface of the grommet 11 tapers in which the diameter of the grommet 11 gradually becomes small toward the radially outside of the rotor 3. Therefore, the grommet 11 and the lead wire 5 are fitted to the partition wall 8 by inserting the lead wire 5 into the through-hole of the grommet 11 and then inserting the grommet 11 and the lead wire 5 into the through-hole 8c of the partition wall 8. When the grommet 11 is under pressure of the sealant M1 upon injection thereof, the grommet 11 becomes pushed to the radially outside of the rotor 3. The configuration in which the through-hole 8c and the grommet 11 taper toward the radially outside of the rotor 3 as described above makes the grommet 11 and the through-hole 8c be strongly fitted to each other as the grommet 11 moves toward the radially outside of the rotor 3. For this reason, when the grommet 11 is under pressure of the sealant M1, leakage of the sealant M1 between the partition wall 8, the grommet 11, and lead wire can be prevented effectively.

The elastic member 9 has higher elasticity (lower rigidity) than the partition wall 8 and is disposed under the partition wall 8 (on the other side of the axial direction). As shown in FIG. 3, the elastic member 9 is provided over the entire region between a pair of internal surfaces 13f of the housing 6 that face the inside of the notch 13d.

Figure 5:
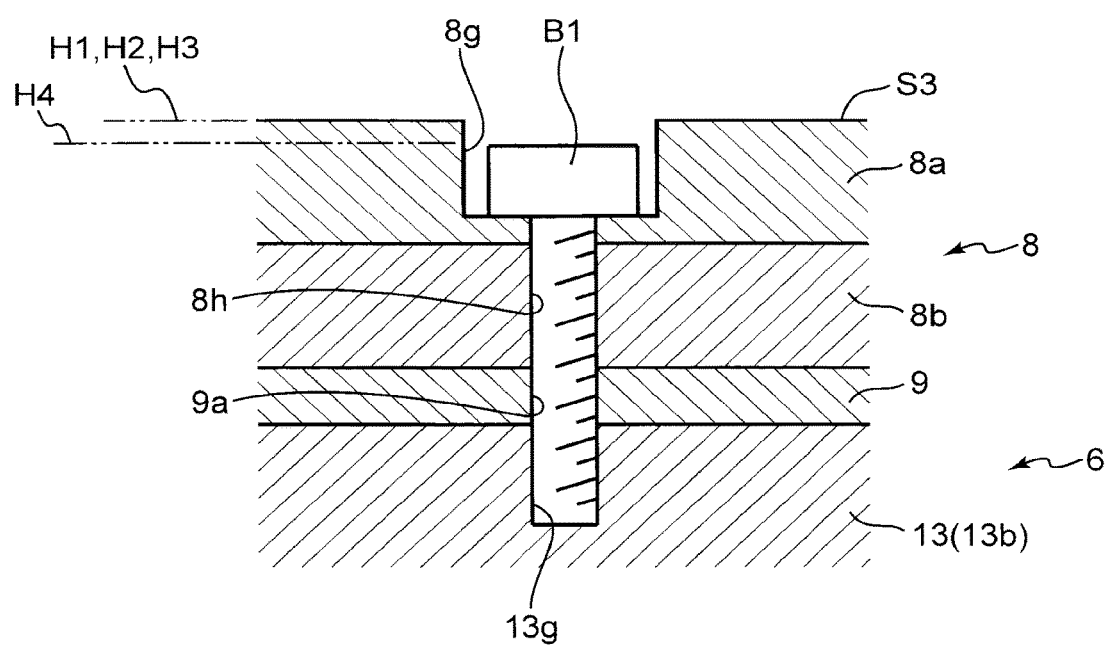
FIG. 5 is a cross-sectional diagram taken along line V-V of FIG. 2.

As shown in FIG. 5, the partition wall 8 is fixed to the housing 6 by bolts B1 that pass through the partition wall 8 and the elastic member 9 from top to bottom and are tightened to the housing 6, in which the elastic member 9 is sandwiched between the partition wall 8 and the housing 6. Specifically, two counterbored holes 8g (FIG. 1 shows only one counterbored hole) extending from an upper surface of the upper piece 8a to the middle of the upper piece 8a and insertion holes 8h that extend from the bottom surfaces of the counterbored holes 8g to a lower surface of the lower piece 8b are formed in the partition wall 8. Moreover, insertion holes 9a penetrating through the elastic member 9 vertically are formed in the elastic member 9. In addition, female screw portions 13g are formed on a bottom surface 13e of the notch 13d of the housing main body 13. The bolts B1 are inserted into the counterbored holes 8g of the partition wall 8 from above and threaded to the female screw portions 13g through the insertion holes 8h, 9a. As a result, the partition wall 8 is fixed to the housing 6, with the elastic member 9 therebetween, and the upper piece 8a and the lower piece 8b are joined together, with the grommet 11 and the lead wire 5 therebetween. The degree of elastic deformation of the elastic member 9 can be adjusted by adjusting the fastening amount of the bolts B1.

Figure 4:
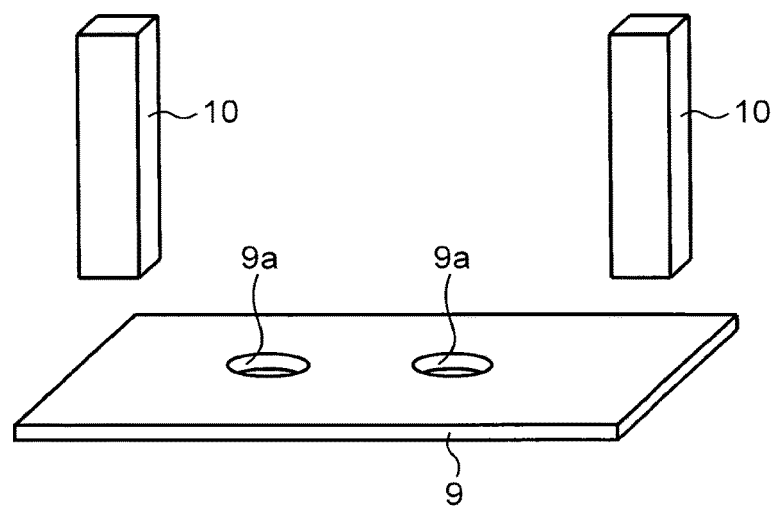
FIG. 4 is an exploded perspective view showing an elastic member and a side elastic member shown in FIG. 3.

As shown in FIGS. 2 to 4, the side elastic members 10 are provided between the internal surface 13f of the housing 6 that face the inside of the notch 13d and side surfaces of the partition wall 8 and have higher elasticity (lower rigidity) than the partition wall 8. Furthermore, the side elastic members 10 are overlapped with the elastic member 9 from above, as shown in FIGS. 3 and 4. Each of the side elastic members 10 has a substantially square cross-section and extends vertically.

Figure 8:
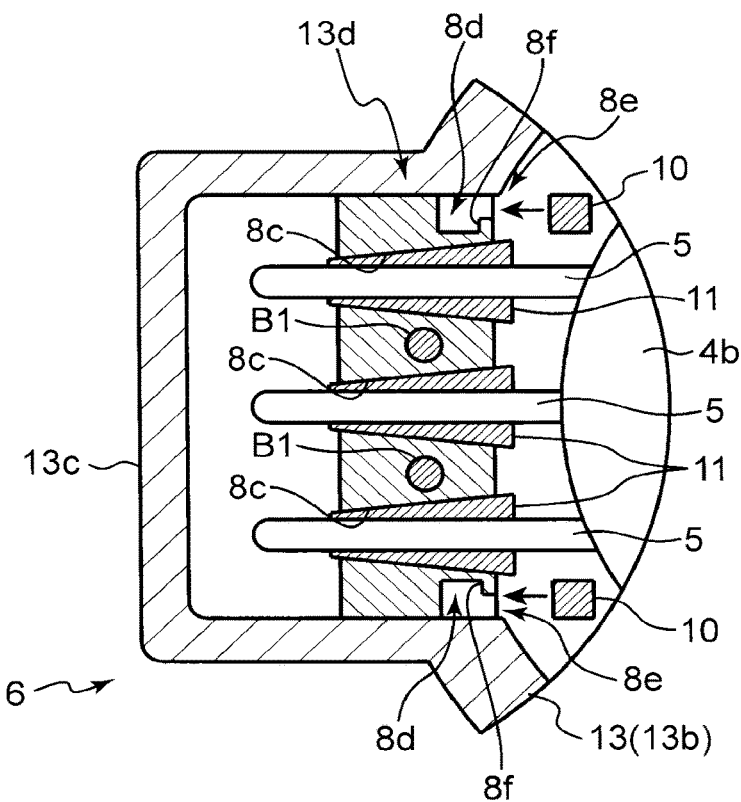
FIG. 8 is a cross-sectional diagram showing the method for manufacturing the electric motor of FIG. 1 in which the side elastic member is attached between a side surface of the partition wall and an internal surface of the housing.

As shown in FIG. 8, the partition wall 8 has formed therein grooves 8d for fitting the side elastic members 10, passages 8e for opening the side elastic members 10 of the grooves 8d to the sealing space P2, and restrictive surfaces 8f that are provided on the sealing space P2 side of the side elastic members 10 in the grooves 8d to restrict the side elastic members 10 from moving toward the sealing space P2.

The grooves 8d are formed by recessing the side surfaces of the partition wall 8 away from the internal surfaces of the notch 13d over the entire vertical range of the partition wall 8.

Each of the passages 8e is formed by cutting one of the wall portions defining the groove 8d that is on the sealing space P2 side, throughout the entire vertical range of the partition wall 8. Specifically, each of the passages 8e is formed by cutting a part of the wall portion on the sealing space P2 that defines the groove 8d, the part excluding the restrictive surface 8f. In other words, each of the restrictive surfaces 8f configures a part of an internal surface of the partition wall 8 that faces the inside of the groove 8d.

The restrictive surfaces 8f are disposed in such a manner as to face the respective side elastic members 10 at the sealing space P2 side thereof. The restrictive surfaces 8f, therefore, can come into abutment with the side surfaces of the side elastic members 10 and thereby restrict the side elastic members 10 from moving toward the sealing space P2.

The part of the partition wall 8 that is on the side opposite to the sealing space P2 with respect to the grooves 8d corresponds to the support portion that supports the side elastic members 10 in the grooves 8d from the side opposite to the sealing space P2.

A method for manufacturing the electric motor 1 is now described hereinafter.

Figure 6:
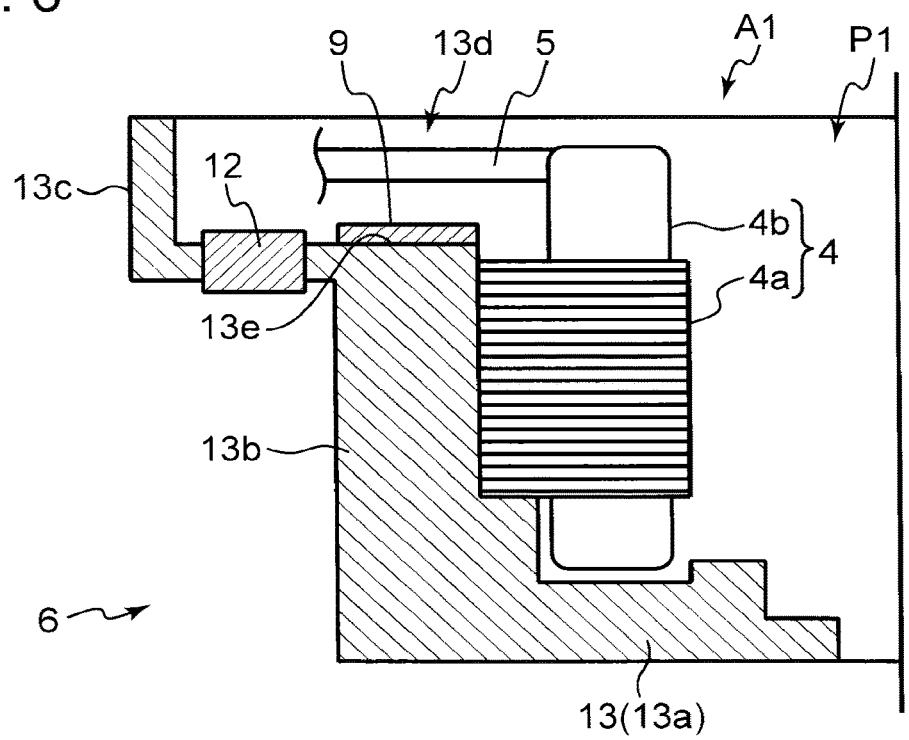
FIG. 6 is a cross-sectional diagram showing a method for manufacturing the electric motor of FIG. 1 in which a stator is attached to a housing.

Step 1 (see FIG. 6): Prepare a structure in which the stator 4 having the lead wire 5 connected thereto is attached in the storage space P1 of the housing.

Step 2 (see FIG. 6): Lay the elastic member 9 on the bottom surface 13e of the notch 13d of the housing 6.

Step 3 (see FIG. 7): Insert the lead wire 5 into the through-hole of the grommet 11, then insert the grommet 11 and the lead wire 5 into each of the through-holes 8c of the partition wall 8 (sandwich the lead wire 5 between the upper piece 8a and the lower piece 8b), and then place this partition wall 8 on the elastic member 9.

Step 4 (see FIG. 5): Adjust the fastening amount of the bolts B1 to the female screw portions 13g of the housing 6, the bolts B1 being inserted into the insertion holes 8h of the partition wall 8 from above.

Specifically, in step 4, the fastening amount of the bolts B1 is adjusted so that a vertical position H2 of an end surface S3 on the partition wall 8 becomes identical to or positioned above a vertical position H1 of the plane surface including the edge surface S2 of the housing 6. FIG. 5 shows how the position H2 and the position H1 are identical to each other.

While having the fastening amount of the bolts B1 adjusted as described above, at least one of the followings is set so that a vertical position H4 of an upper end surface of each bolt B1 becomes lower than the position H1: the size of the bolts B1, the thicknesses of the partition wall 8 and the elastic member 9, and the depth of the counterbored holes 8g of the partition wall 8.

Step 5 (see FIG. 8): Insert the side elastic members 10 into the grooves 8d of the partition wall 8 through the passages 8e from the sealing space P2 side. Although the width of each passage 8e is set to be narrower than the width of each groove 8d, the side elastic members 10 can be allowed to pass through the passages 8e by shortening the side elastic members 10.

As shown in FIG. 5, the size of the side elastic member 10 is set in such a manner that a position H3 of an upper end surface on each side elastic member 10 is identical to the position H2 of the upper end surface S3 on the partition wall 8.

Steps 1 to 5 described above correspond to the preparation step of preparing an assembly having the housing 6, the stator 4, the partition wall 8, and the lead wire 5. In this preparation step, the order of steps 1 to 3 is not limited to the foregoing order as long as steps 1 to 3 are performed prior to step 4, and the tasks of steps 1 to 3 do not have to be divided into these steps 1 to 3. In addition, step 5 may be executed prior to step 4.

Figure 9:
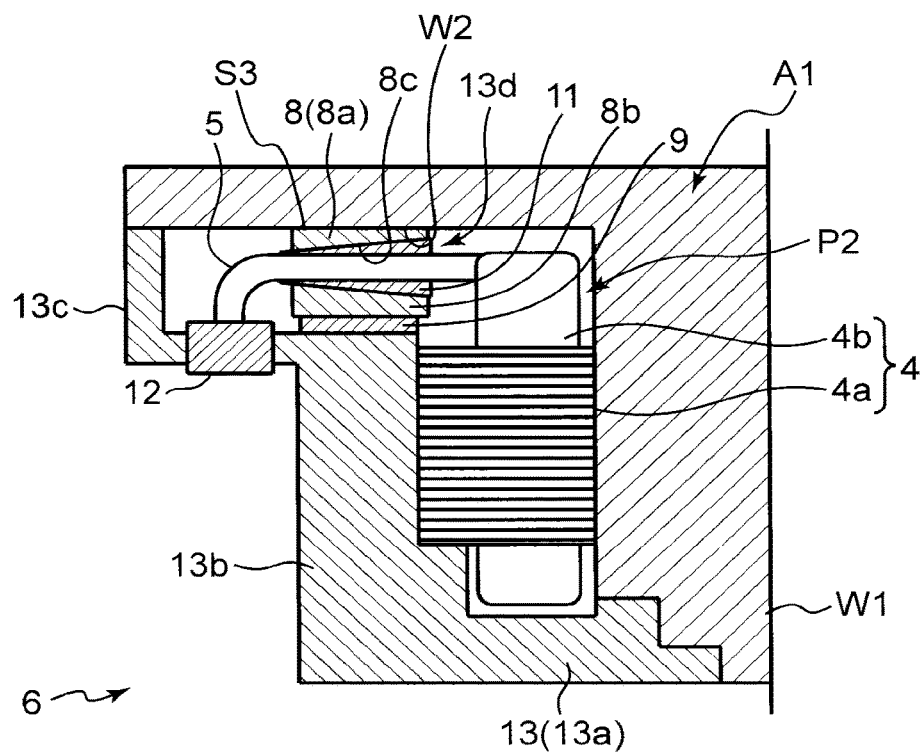
FIG. 9 is a cross-sectional diagram showing the method for manufacturing the electric motor of FIG. 1 in which an injection mold is mounted in the housing.

Step 6 (see FIG. 9): Mount an injection mold W1 (an example of the closing member) onto the partition wall 8 and the housing 6 from above so as to close the opening of the housing 6, and then form the sealing space P2 between the injection mold W1, the housing 6, and the partition wall 8 (the sealing space formation step).

Specifically, in step 6, the end surface S3 of the partition wall 8 and the edge surface S2 of the housing 6 are pressed by a flat pressure surface W2 of the injection mold W1 so that the end surface S3 of the partition wall 8 and the edge surface S2 of the housing 6 become flush with each other.

As a result, with the end surface S3 of the partition wall 8 and the edge surface S2 of the housing 6 being disposed flush with each other, the pressure surface W2 of the injection mold W1 can be come into contact with these surfaces S2, S3, preventing leakage of the sealant M1 from between these surfaces S2, S3 and the pressure surface W2.

Figure 10:
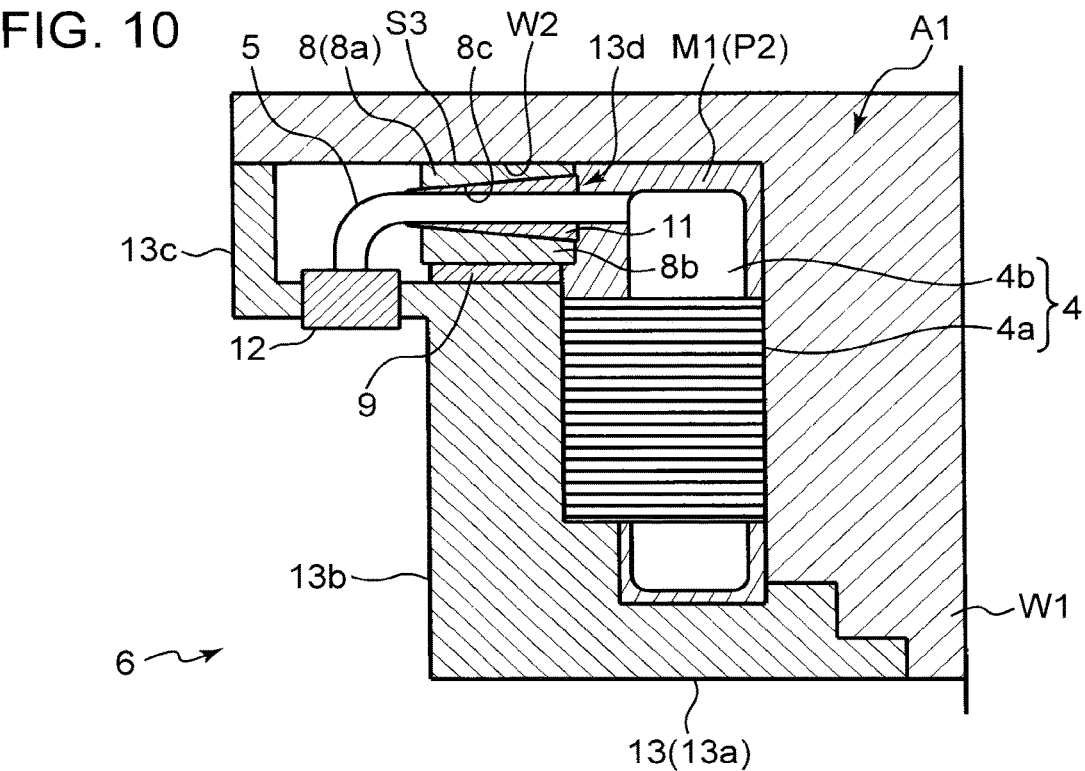
FIG. 10 is a cross-sectional diagram showing the method for manufacturing the electric motor of FIG. 1 in which a sealant is injected into a sealing space.

Step 7 (see FIG. 10): Cover the stator 4 with the sealant M1 by injecting the sealant M1 into the sealing space P2 through the injection mold W1 during the execution of step 6 (the sealant injection step).

Step 8 (see FIG. 1): Remove the injection mold W1, insert the shaft 2, the rotor 3, and the bearings 14, 16 into the storage space P1 of the housing 6, and attach the cover 7 to the housing 6 using a bolt, not shown, with the contact surface S1 of the cover 7 being come into contact with the edge surface S2 of the housing 6 and the end surface S3 of the partition wall 8.

When using the cover in place of the injection mold W1 in step 6, the shaft 2, the rotor 3, and the bearings 14, 16 are attached inside the housing 6 during step 6, and step 8 is omitted because the cover is fixed to the housing 6 in step 6. In this case, the cover has a division wall and the like for preventing the sealant from flowing into the region other the sealing space P2 in the housing 6.

Figure 7:
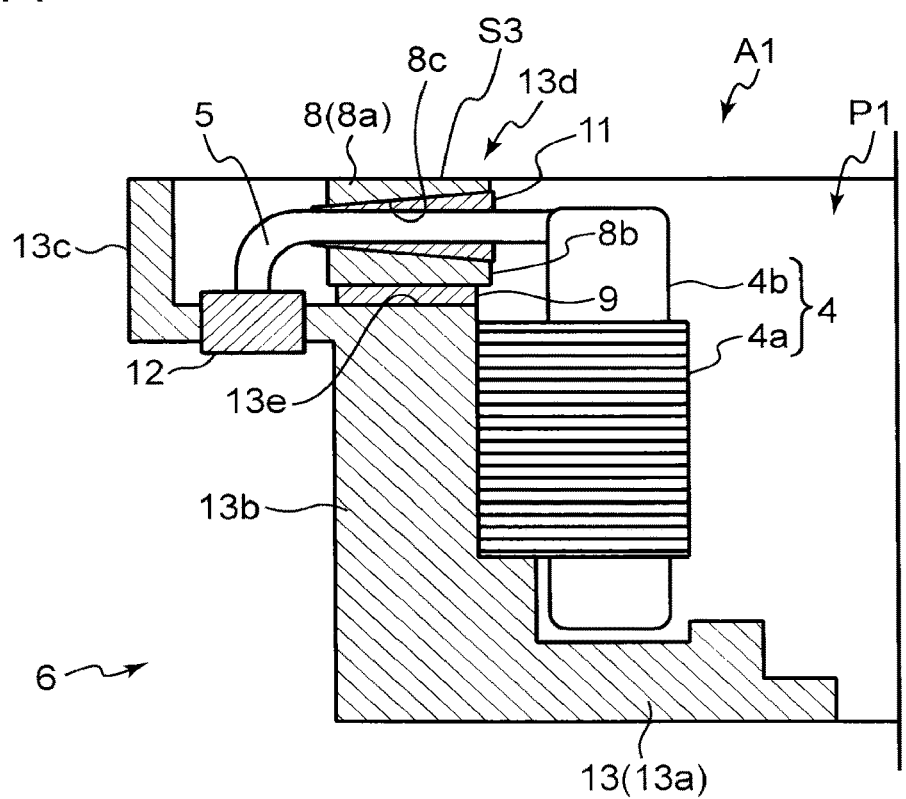
FIG. 7 is a cross-sectional diagram showing the method for manufacturing the electric motor of FIG. 1 in which the elastic member and a partition wall are attached to the housing.

The lead wire 5 is attached to the terminal block 12 between step 3 and step 8 (FIG. 7 shows a state in which the lead wire 5 is connected to the terminal block 12 after step 3).

As described above, the elastic member 9 that is more elastic than the partition wall 8 is used. In other words, the partition wall 8 that is more rigid than the elastic member 9 is used. Therefore, the partition wall 8 can be prevented from being elastically deformed by the pressure of the sealant M1 upon injection thereof, thereby preventing leakage of the sealant M1 from between the closing member (the injection mold W1 or the cover 7) mounted in the housing 6, the partition wall 8, and the housing 6 upon injection of the sealant.

The end surface of the partition wall 8 is disposed on or above the plane surface including the edge surface S2 of the housing 6. Thus, the flat pressure surface W2 of the injection mold W1 (or the flat contact surface S1 of the cover 7) presses the edge surface S2 of the housing 6 and the end surface S3 of the partition wall 8 upon injection of the sealant M1. As a result, the edge surface S2 of the housing 6 and the end surface S3 of the partition wall 8 become flush with each other, and the pressure surface W2 of the injection mold W1 can be come into contact with the edge surface S2 of the housing 6, and the end surface S3 of the partition wall 8. In this manner, leakage of the sealant M1 from between these surfaces can be prevented.

Moreover, entry of water into the housing 6 through between the cover 7, the housing 6, and the partition wall 8 can be prevented while having the cover 7 attached to the housing 6 in such a manner that the flat contact surface S1 of the cover 7 comes into contact with the end surface S3 of the partition wall 8 and the edge surface S2 of the housing 6.

The first embodiment can accomplish the following effects.

Because the elastic member 9 is disposed under the partition wall 8, i.e., within the notch 13d, the internal surfaces 13f of the notch 13d can restrict the elastic member 9 from extending to the edge surface S2 of the housing 6 when the end surface S3 of the partition wall 8 is pressed by the injection mold W1. Therefore, leakage of the sealant M1 can be prevented more reliably by securely causing the end surface S3 of the partition wall 8 and the edge surface S2 of the housing 6 come into contact with the pressure surface W2 of the injection mold W1.

The degree of deformation of the elastic member 9 can be adjusted to adjust the position of the end surface S3 of the partition wall 8 by adjusting the fastening amount of each bolt B1 fastened to the housing 6.

The presence of the side elastic members 10 can prevent the sealant M1 from leaking from between the internal surfaces 13f of the housing 6 and the side surface of the partition wall 8.

When the side elastic members 10 are under pressure of the sealant M1 through the passages 8e, the side elastic members 10 are supported by the support portion (the part of the partition wall 8 that is opposite to the sealing space P2 with respect to the grooves 8d) from the side opposite to the sealing space P2. Therefore, the movement of the side elastic members 10 with respect to the partition wall 8 and the housing 6 can be restricted, whereby the side elastic members 10 that can no longer move elastically deform laterally and come into tightly contact with the internal surfaces 13f of the notch 13d. Consequently, leakage of the sealant M1 can be prevented more reliably.

Because the restrictive surfaces 8f of the partition wall 8 can restrict the movement of the side elastic members 10 prior to the injection of the sealant, the sealant can be injected efficiently.

Second Embodiment

The first embodiment has described the example in which the elastic member 9 is provided under the partition wall 8 (the other side of the axial direction). However, the elastic member 9 can be provided above the partition wall 8 as in an electric motor according to a second embodiment shown in FIG. 11.

Figure 11:
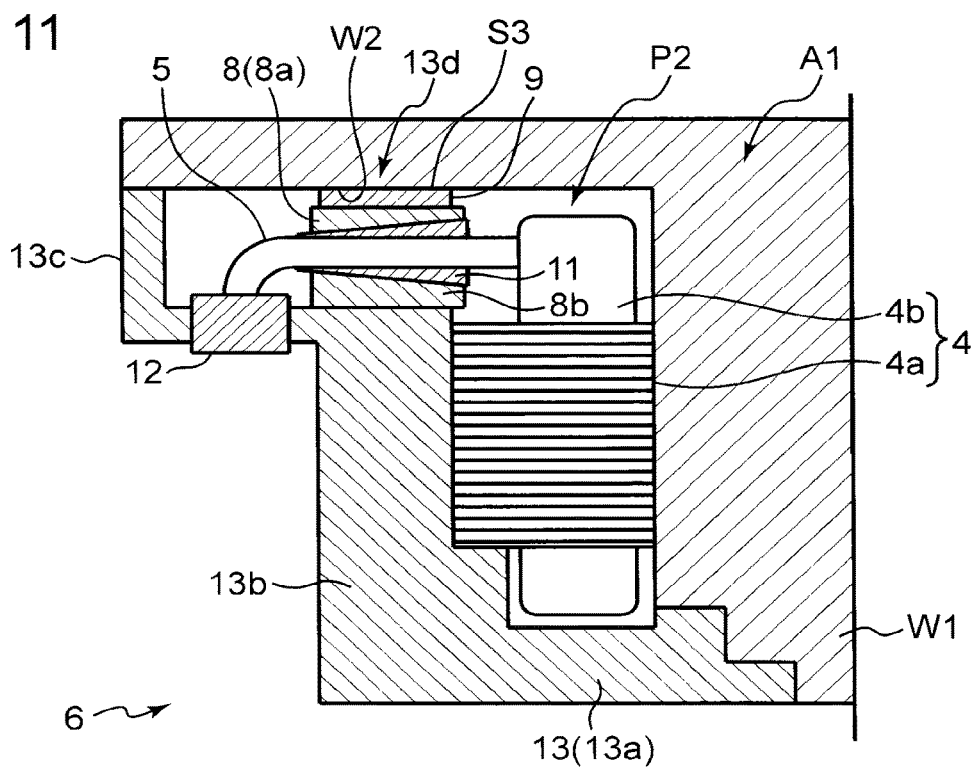
FIG. 11 is a diagram corresponding to FIG. 9, showing an electric motor according to a second embodiment of the present invention.

In the second embodiment as well, the end surface S3 on the elastic member 9 is disposed on or above the plane surface including the edge surface S2 of the housing 6 (see FIG. 1) prior to mounting the closing member (FIG. 11 shows the injection mold W1).

Specifically, the elastic member 9 is provided over the entire region between the internal surfaces 13f (see FIG. 3) of the housing 6 (between the side surfaces of the partition wall 8) that face the inside of the notch 13d.

Therefore, the end surface S3 of the elastic member 9 and the edge surface S2 of the housing 6 can be placed flush with each other by causing the pressure surface W2 of the injection mold W1 to press these surfaces S2, S3 to causing these faces S2, S3 come into contact with the pressure surface W2, preventing leakage of the sealant.

In the second embodiment, pressing the elastic member 9 with the pressure surface W2 of the injection mold W1 is likely to cause the elastic member 9 to elastically deform and cause a part of the elastic member 9 to protrude above the edge surface S2 of the housing 6, thereby negatively affecting the contact between the injection mold W1 and the housing 6.

In the second embodiment, therefore, it is preferred that a recess extending between the side surfaces of the partition wall 8 be formed on the upper surface of the partition wall 8 and that the elastic member 9 be inserted into this recess. According to this configuration, the internal surfaces 13f (see FIG. 3) of the housing 6 can restrict the elastic member 9 from elastically deforming toward the edge surface S2 of the housing 6 when pressed by the injection mold W1.

Note that the present invention is not limited to the foregoing embodiments. The following aspects, for example, can be employed.

The grommet 11 can be omitted as long as the adhesion between the lead wire 5 and the internal surface of the through-hole 8c can be ensured by, for example, adjusting the elasticity of at least one of the partition wall 8 and the covered section of the lead wire 5.

The sealant M1 may be injected so as to cover at least a part of the stator 4 (e.g., the coil ends of the stator coil 4b).

The partition wall 8 with the upper piece 8a and the lower piece 8b has been described above. However, the configuration of the partition wall 8 is not limited to the foregoing configuration. For instance, the partition wall 8 may be configured with a single member having the through-hole 8c.

It should be note that the foregoing specific embodiments mainly include inventions containing the following configurations.

In order to achieve the foregoing object, the present invention provides an electric motor, having: a rotor; a stator disposed around the rotor; a housing that has a storage space for storing the rotor and the stator, an opening for opening the storage space to one side of an axial direction along a central axis of rotation of the rotor, and a notch that is concaved from an edge surface surrounding the opening toward the other side of the axial direction; a lead wire connected to the stator; a partition wall that is provided on the inside of the notch of the housing in order to separate a sealing space for injecting a sealant for covering at least a part of the stator and a space outside the sealing space from each other, and has a through-hole for allowing the lead wire to be extended to the outside of the sealing space; a cover that can be attached to the housing from the one side of the axial direction; and an elastic member that is more elastic than the partition wall and overlapped with the partition wall in the axial direction, wherein an end surface of the partition wall or of the elastic member that is disposed on the one side of the axial direction is disposed on a plane surface including the edge surface of the housing or on the one side of the axial direction with respect to the plane surface, and the cover has a flat contact surface capable of coming into contact with the end surface of the partition wall or of the elastic member and the edge surface of the housing.

According to the present invention, the elastic member that is more elastic than the partition wall is used. In other words, the partition wall that is more rigid than the elastic member is used. This configuration can prevent the partition wall from being elastically deformed by the pressure of the sealant upon injection thereof, thereby preventing leakage of the sealant from between the closing member (the injection mold or the cover) mounted in the housing, the partition wall, and the housing upon injection of the sealant.

According to the present invention, the end surface of the partition wall or of the elastic member is disposed on a plane surface including the edge surface of the housing or on one side of the axial direction with respect to the plane surface. Therefore, the edge surface of the housing and the end surface of the partition wall or of the elastic member are placed flush with each other by causing the flat pressure surface of the closing member (or the flat contact surface of the cover) to press the edge surface of the housing and the end surface of the partition wall or of the elastic member at the time of the injection of the sealant, causing the pressure surface of the closing member to come into contact with the edge surface of the housing and the end surface of the partition wall or of the elastic member. Consequently, leakage of the sealant from between these surfaces can be prevented.

Moreover, entry of water into the housing through between the cover, the housing, and the partition wall or the elastic member can be prevented while having the cover attached to the housing in such a manner that the flat contact surface of the cover comes into contact with the end surface of the partition wall or of the elastic member and the edge surface of the housing.

Such an expression in the present invention as "an end surface of the partition wall or of the elastic member that is disposed on the one side of the axial direction is disposed on a plane surface including the edge surface of the housing or on the one side of the axial direction with respect to the plane surface" indicates the state obtained prior to mounting the closing member (the injection mold or the cover) onto the housing.

In addition, the term "an end surface of the partition wall or of the elastic member that is disposed on the one side of the axial direction" means the end surface of the partition wall or of the elastic member at one side of the axial direction.

In a case where the elastic member is provided on one side of the axial direction with respect to the partition wall, there is a possibility that the elastic member extends above the edge surface of the housing when the end surface of the elastic member is pressed by the closing member, making it difficult for the closing member and the housing to come into contact with each other.

In this electric motor, it is preferred that the elastic member be disposed on the other side of the axial direction with respect to the partition wall.

According to this aspect, the elastic member is disposed on the other side of the axial direction with respect to the partition wall, i.e., in the notch. Therefore, the internal surfaces of the notch can restrict the elastic member from extending toward the edge surface of the housing when the end surface of the partition wall is pressed by the closing member. Therefore, leakage of the sealant can be prevented more reliably by causing the end surface of the partition wall and the edge surface of the housing come into contact with the pressure surface of the closing member.

Although the position of the end surface of the partition wall can be adjusted by adjusting the thicknesses of the partition wall and the elastic member, it is difficult to finely adjust the position of the end surface of the partition wall.

Therefore, it is preferred that the electric motor further have a bolt that penetrates through the partition wall from the one side to the other side of the axial direction and is fastened to the housing, and that the partition wall be fixed to the housing by the bolt, with the elastic member being sandwiched between the partition wall and the housing.

According to this aspect, the degree of deformation of the elastic member can be adjusted to adjust the position of the end surface of the partition wall by adjusting the fastening amount of the bolt to the housing.

It is preferred that the electric motor further have a side elastic member that is more elastic than the partition wall and provided between an internal surface of the housing that faces the inside of the notch and the partition wall.

This aspect can prevent leakage of the sealant from between the internal surface of the housing and a side surface of the partition wall.

The side elastic member may be held by the housing and the partition wall by being sandwiched between the internal surface of the housing and the side surface of the partition wall. In this case, however, there is a risk that the side elastic member might move with respect to the partition wall and the housing when the pressure applied to the side elastic member by the sealant increases.

Therefore, in this electric motor, it is preferred that the partition wall have a support portion for supporting the side elastic member from the side opposite to the sealing space, and a passage that is provided on the side opposite to the support portion with respect to the side elastic member and opens the side elastic member to the sealing space.

According to this configuration, when the side elastic member receives pressure from the sealant through the passage, the side elastic member is supported by the support portion from the side opposite to the sealing space. Therefore, the movement of the side elastic member with respect to the partition wall and the housing can be restricted, whereby the side elastic member that can no longer move elastically deforms laterally and comes into tightly contact with the internal surface of the notch. This aspect, therefore, can prevent leakage of the sealant more reliably.

The entire side elastic member may be opened to the sealing space by the passage. In this case, however, after the side elastic member is positioned between the partition wall and the internal surface of the housing, there is a risk that the side elastic member might move toward the sealing space prior to the injection of the sealant.

In this electric motor, therefore, it is preferred that the partition wall have a restrictive surface that is provided on the side opposite to the support portion with respect to the side elastic member and restricts movement of the side elastic member toward the sealing space.

According to this aspect, the sealant can be injected efficiently by having the restrictive surface restrict the movement of the side elastic member prior to the injection of the sealant.

The present invention is also a method for manufacturing an electric motor, having: a preparation step of preparing an assembly that has a housing having a storage space for storing a rotor and a stator disposed around the rotor, an opening for opening the storage space to one side of an axial direction along a central axis of rotation of the rotor, and a notch concaved from an edge surface surrounding the opening toward the other side of the axial direction, the stator provided on the inside of the storage space of the housing, a partition wall that is attached to the inside of the notch of the housing in order to separate a sealing space for injecting a sealant for covering at least a part of the stator and a space outside the sealing space from each other, and a lead wire that is connected to the stator and extended to the outside of the sealing space through a through-hole formed in the partition wall; a sealing space formation step of mounting a closing member onto the partition wall and the housing from the one side of the axial direction so as to close the opening of the housing, to form the sealing space between the closing member, the housing, and the partition wall; and a sealant injection step of injecting the sealant into the sealing space during the sealing space formation step, to cover at least a part of the stator with the sealant, wherein in the preparation step, while an elastic member that is more elastic than the partition wall is overlapped with the partition wall in the axial direction, the partition wall and the elastic member are attached to the inside of the notch of the housing in such a manner that an end surface of the partition wall or of the elastic member that is disposed on the one side of the axial direction is disposed on a plane surface including the edge surface of the housing or on the one side of the axial direction with respect to the plane surface, and in the sealing space formation step, the end surface of the partition wall or of the elastic member and the edge surface of the housing are pressed by a flat pressure surface of the closing member in such a manner that the end surface of the partition wall or of the elastic member and the edge surface of the housing are placed flush with each other.

According to the present invention, the elastic member that is more elastic than the partition wall is used. In other words, the partition wall that is more rigid than the elastic member is used. This configuration can prevent the partition wall from being elastically deformed by the pressure of the sealant upon injection thereof, thereby preventing leakage of the sealant from between the closing member (the injection mold or the cover) mounted in the housing, the partition wall, and the housing upon injection of the sealant.

In addition, according to the present invention, the end surface of the partition wall or of the elastic member is disposed on the plane surface including the edge surface of the housing or on one side of the axial direction with respect to the plane surface. Therefore, the edge surface of the housing and the end surface of the partition wall or of the elastic member are placed flush with each other by causing the flat pressure surface of the closing member (or the flat contact surface of the cover) to press the edge surface of the housing and the end surface of the partition wall or of the elastic member at the time of injection of the sealant, causing the pressure surface of the closing member to come into contact with the edge surface of the housing and the end surface of the partition wall or of the elastic member. Consequently, leakage of the sealant from between these surfaces can be prevented.

Note that the term "an end surface of the partition wall or of the elastic member that is disposed on the one side of the axial direction" means the end surface of the partition wall or of the elastic member at one side of the axial direction.

This application is based on Japanese Patent application No. 2015-129727 filed in Japan Patent Office on Jun. 29, 2015, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:
1. An electric motor, comprising:
   a rotor;
   a stator disposed around the rotor;
   a housing that has a storage space for storing the rotor and the stator, an opening for opening the storage space to one side in an axial direction along a central axis of rotation of the rotor, and a notch that is concaved from an edge surface surrounding the opening toward the other side of the axial direction;
   a lead wire connected to the stator;
   a partition wall that is provided on the inside of the notch of the housing in order to separate a sealing space for injecting a sealant for covering at least a part of the stator and a space outside the sealing space from each other, and has a through-hole for allowing the lead wire to be extended to the outside of the sealing space;
   a cover that can be attached to the housing from the one side in the axial direction; and
   an elastic member that is more elastic than the partition wall and overlapped with the partition wall in the axial direction, wherein an end surface of the partition wall, or of the elastic member, that is disposed at the one side in the axial direction, is disposed on a plane surface including the edge surface of the housing or on the one side in the axial direction with respect to the plane surface, and the cover has a flat contact surface capable of coming into contact with the end surface of the partition wall or the elastic member and with the edge surface of the housing, wherein the elastic member is provided at the one side in the axial direction with respect to the partition wall or at another side in the axial direction with respect to the partition wall, wherein the another side is opposite the one side in the axial direction, and wherein when the elastic member is provided at the one side in the axial direction the elastic member separates the partition wall from the cover such that the partition wall does not contact the cover, and when the elastic member is provided at the another side in the axial direction the elastic member separates the partition wall from the housing such that the partition wall does not contact the housing.

2. The electric motor according to claim 1, wherein the elastic member is disposed on the other side of the axial direction with respect to the partition wall.

3. The electric motor according to claim 2, further comprising:
a bolt that penetrates through the partition wall from the one side to the other side of the axial direction and is fastened to the housing,
wherein the partition wall is fixed to the housing by the bolt, with the elastic member being sandwiched between the partition wall and the housing.

4. The electric motor according to claim 1, further comprising a side elastic member that is more elastic than the partition wall and provided between an internal surface of the housing that faces the inside of the notch and the partition wall.

5. An electric motor, comprising:
a rotor;
a stator disposed around the rotor;
a housing that has a storage space for storing the rotor and the stator, an opening for opening the storage space to one side in an axial direction along a central axis of rotation of the rotor, and a notch that is concaved from an edge surface surrounding the opening toward the other side of the axial direction;
a lead wire connected to the stator;
a partition wall that is provided on the inside of the notch of the housing in order to separate a sealing space for injecting a sealant for covering at least a part of the stator and a space outside the sealing space from each other, and has a through-hole for allowing the lead wire to be extended to the outside of the sealing space;
a cover that can be attached to the housing from the one side in the axial direction; and
an elastic member that is more elastic than the partition wall and overlapped with the partition wall in the axial direction,
wherein an end surface of the partition wall, or of the elastic member, that is disposed at the one side in the axial direction, is disposed on a plane surface including the edge surface of the housing or on the one side in the axial direction with respect to the plane surface, and
the cover has a flat contact surface capable of coming into contact with the end surface of the partition wall or the elastic member and with the edge surface of the housing,
further comprising a side elastic member that is more elastic than the partition wall and provided between an internal surface of the housing that faces the inside of the notch and the partition wall,
wherein the partition wall has a support portion for supporting the side elastic member from the side opposite to the sealing space, and a passage that is provided on the side opposite to the support portion with respect to the side elastic member and opens the side elastic member to the sealing space.

6. The electric motor according to claim 5, wherein the partition wall has a restrictive surface that is provided on the side opposite to the support portion with respect to the side elastic member and restricts movement of the side elastic member toward the sealing space.

7. The electric motor according to claim 5, wherein the elastic member is disposed on the other side of the axial direction with respect to the partition wall.

8. The electric motor according to claim 7, further comprising:
a bolt that penetrates through the partition wall from the one side to the other side of the axial direction and is fastened to the housing,
wherein the partition wall is fixed to the housing by the bolt, with the elastic member being sandwiched between the partition wall and the housing.

* * * * *